C. A. CODDING.
Cheese Hoop.

No. 32,820. Patented July 16, 1861.

Witnesses:

Inventor:

UNITED STATES PATENT OFFICE.

C. A. CODDING, OF AUGUSTA, MICHIGAN.

CHEESE-PRESS.

Specification of Letters Patent No. 32,820, dated July 16, 1861.

*To all whom it may concern:*

Be it known that I, C. A. CODDING, of Augusta, in the county of Kalamazoo and State of Michigan, have invented a new and Improved Cheese-Press; and I do hereby declare that the following is a full, clear, and exact description of the same, reference being had to the annexed drawings, making part of this specification, in which—

Figure 1:
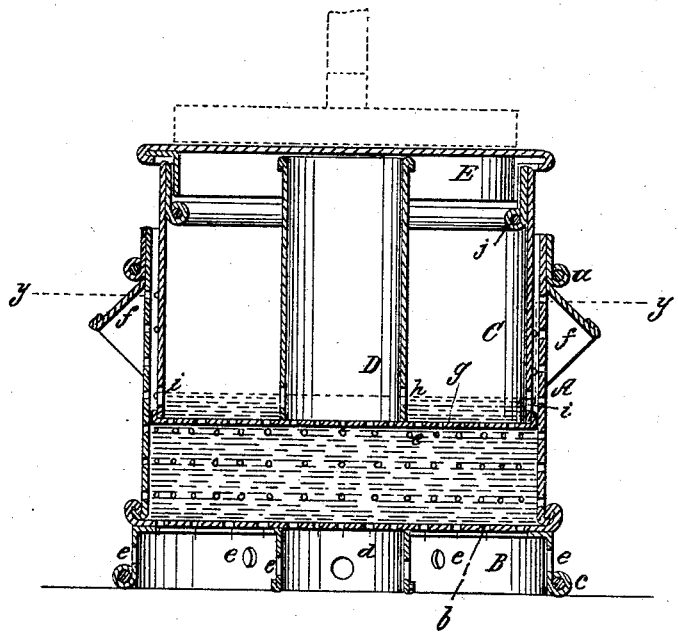
Figure 2:
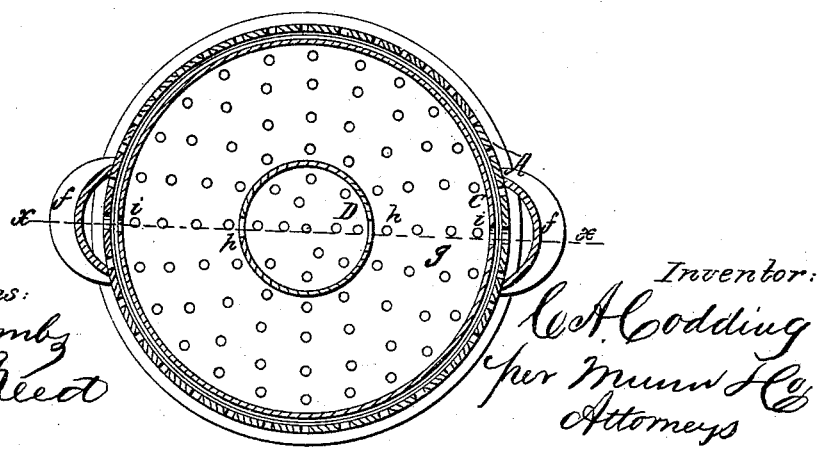

Figure 1, is a vertical central section of my invention, taken in the line $x$, $x$, Fig. 2; and Fig. 2, a horizontal section of the same, taken in the line $y$, $y$, Fig. 1.

Similar letters of reference indicate corresponding parts in the two figures.

The object of this invention is to obtain a cheese press which will admit of the ready escape of the whey from the curd when the latter is under pressure, and allow a current of air to circulate all around the curd.

The invention consists in the employment or use of a perforated curb in connection with a perforated hollow plunger constructed and arranged as hereinafter described.

To enable those skilled in the art to fully understand and construct my invention, I will proceed to describe it.

A, represents a perforated cylinder, which is constructed of sheet-metal and rendered stiff and firm by having its upper edge turned over outward with a stout wire or rod, $a$, inserted in it, as shown in Fig. 1. The lower end of cylinder A has a perforated bottom, $b$, secured to it; and to the bottom $b$, a hollow base B is attached, the lower end of which has a wire or rod, $c$, fitted in it. To the center of the perforated bottom $b$, there is secured a tube, $d$, which extends down as low as the base B, and which, as well as the base B, has holes or openings, $e$, made in it all around at proper distances apart; see Fig. 1. The cylinder A is provided with handles, $f$, $f$, at opposite points.

C, is a hollow cylindrical plunger which is of such diameter that it may fit snugly in cylinder A, but work freely up and down therein. The bottom, $g$, of the plunger is perforated, and a tube, D, is secured centrally within it; said tube extending up as high as the top of the plunger. The tube D has holes, $h$, made in it near its lower end; and holes, $i$, are also made in the side of the plunger near its bottom, $g$. The upper end of the plunger C, is turned over in an inward direction, and has a wire or rod, $j$, fitted in it. This wire or rod $j$, with the doubled upper end of the plunger, and tube D, render the plunger very stiff and firm; while the attachment of the hollow base B, with its central tube $d$, in connection with the upper doubled end of the cylinder A and rod $a$, render the cylinder A very stiff and firm. The hollow cylinder C, is provided with a cover, E.

The press is used as follows: The cylinder A, which is a curb to hold the curd, is placed in a pan or on a suitable drain. The plunger C is removed, and the curd, which is prepared in the usual way, is placed in the curb or cylinder A. The plunger C is then placed in the cylinder or curb A, and the plunger forced down with a suitable pressure. The curd being thus compressed, the whey is allowed to escape through the perforated bottom $b$, through the side of the cylinder or curb A, and upward through the perforated bottom, $g$, of the plunger C, the whey escaping from the interior of the plunger C, through the openings $i$, and from the tube D through the openings $h$. Thus it will be seen that a free escape is allowed for the whey all around the curd, and the latter is exposed on all sides to a free circulation of air.

Having thus described my invention, what I claim as new and desire to secure by Letters Patent, is:

1. The perforated cylinder or curb A, in combination with the hollow cylindrical plunger C, provided with the perforated bottom $g$, and side openings $i$, arranged to operate as and for the purpose set forth.

2. Having the hollow plunger C, doubled or turned over at its upper end, and provided with a wire or rod $j$, in connection with the central tube D, and having the cylinder or curb A secured to a hollow base B, which is provided with a central tube $d$; all being arranged as shown, for the purpose of rendering the cylinder or curb and plunger firm and durable, as set forth.

C. A. CODDING.

Witnesses:
O. R. SMITH,
J. W. LANE.